(12) United States Patent
Carrott

(10) Patent No.: US 6,639,552 B2
(45) Date of Patent: Oct. 28, 2003

(54) METHOD OF AND APPARATUS FOR DERIVING A SIGNAL FOR ENABLING A RADIO WAVE SOURCE LOCATION TO BE DERIVED

(75) Inventor: David T. Carrott, Bristow, VA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/941,614

(22) Filed: Aug. 30, 2001

(65) Prior Publication Data

US 2003/0043072 A1 Mar. 6, 2003

(51) Int. Cl.[7] .............................. G01S 1/24; G01S 5/02
(52) U.S. Cl. ...................... 342/387; 342/424; 342/442; 342/465
(58) Field of Search ................................. 342/387, 442, 342/465, 424; 359/305, 311

(56) References Cited

U.S. PATENT DOCUMENTS

| | | | | |
|---|---|---|---|---|
| 4,012,120 A | * | 3/1977 | Kagiwada et al. ........... 333/150 |
| 4,468,084 A | * | 8/1984 | Hutcheson et al. ......... 359/558 |
| 4,604,717 A | * | 8/1986 | Kaplan ....................... 327/261 |
| 4,888,593 A | * | 12/1989 | Friedman et al. ........... 342/375 |
| 5,327,144 A | | 7/1994 | Stilp et al. |
| 5,512,908 A | | 4/1996 | Herrick |
| 6,043,924 A | | 3/2000 | Montgomery et al. |
| 6,201,499 B1 | * | 3/2001 | Hawkes et al. ............. 342/387 |
| 6,285,493 B1 | | 9/2001 | Carrott et al. |

OTHER PUBLICATIONS

Rajeswari, K. Raja et al, "Time–Delay Estimation Using MLE Approach for Wide–Band Radar Systems" Proceedings of the ICS '98, pp. 1493–1496.*

Mizusawa, George A., "Performance of Hyperbolic Position Location Techniques for Code Division Multiple Access" Thesis, Aug. 1996, Chap. 3, pp.34–60.*

Bazzi, O. et al, "A 1023–bit Acousto–Optic Correlator for Direct Sequency Spread Spectrum Applications" Ultrasonic Symposium 1991, pp. 573–576.*

A.W. Houghton et al., "Spread Spectrum Signal Detection Using a Cross Corelation Receiver," HMSO London, 1995.

* cited by examiner

Primary Examiner—Gregory C. Issing
(74) Attorney, Agent, or Firm—Lowe Hauptman Gilman & Berner, LLP

(57) ABSTRACT

The location of a cellular telephone handset relative to the sites of two pairs of fixed cellular transceivers is determined by responding to the phase difference of radio waves the handset emits, as coupled to the sites. The phase difference is detected by supplying replicas of the waves received at the first and second sites to first and second electro-acoustical transducers at opposite ends of a Bragg cell. One Bragg cell is thus associated with each pair of cellular transceivers. A laser beam incident on each Bragg cell is deflected by a moving optical grating resulting from the interaction of acoustic waves applied by the electro-acoustical transducers to the particular Bragg cell. The laser beam deflection angle for each Bragg cell determines the relative phase angle of the acoustic waves in that cell. Indications of the deflection angles, positions of the transceivers and propagation speeds of replicas of the radio waves propagating in communication links between the sites are combined to indicate the handset location.

28 Claims, 3 Drawing Sheets

METHOD OF AND APPARATUS FOR DERIVING A SIGNAL FOR ENABLING A RADIO WAVE SOURCE LOCATION TO BE DERIVED

RELATION TO APPLICATION

The present application discloses a use for the structure disclosed in the commonly-assigned application, Ser. No. 09/629,157, filed Jul. 31, 2000, entitled Electro-Acoustic-Optical Apparatus and Method of Calibrating Same, by Carrott et al.

FIELD OF INVENTION

The present invention relates generally to an apparatus for and method of enabling the location of a radio wave source to be determined and, more particularly, to such an apparatus and method wherein replicas of waves transmitted from a radio wave source and received at receiver sites having known locations are applied to transducers which apply acoustic waves in opposite directions to a diffraction grating for modulating an optical wave.

BACKGROUND ART

Time difference of arrival (TDOA) is a well-documented method of locating a radio frequency source. TDOA works by detecting the difference in phase of an RF wave emitted by an RF source and received by receivers having known locations. Replicas of the waves received by the receivers are supplied to an electronic phase detector. If the receivers are exactly the same distance from the RF source the phase of the RF signal at the receivers is the same, causing the phase detector to derive a null output level. If the RF source moves relative to a line equi-distant from the two receivers, one receiver is closer to the source than the other, causing a phase difference between the signals at the receivers so that the phase detector derives a signal having an amplitude and polarity indicative of the phase difference.

A problem with this typical TDOA arrangement employing phase detectors is that when the phase detector derives a null output level it is not possible to determine on which side of the two receivers the RF source is located. This problem can be resolved by including a second pair of receivers to derive a second TDOA output signal. The two pairs of receivers frequently include a common receiver. However, use of two pairs of receivers does not resolve the problems associated with relying on phase detectors deriving signals having very small amplitudes, as occurs when the two receivers are approximately equi-distant from the RF source.

I have realized that the system disclosed in the co-pending, previously mentioned application is ideally suited for detecting the time difference of arrival of an RF wave having a predetermined frequency and initial phase emitted by an RF source. This is because that system is able to derive an accurate relatively constant amplitude indication of the relative phase of the RF waves received by the two spaced receivers having known positions. In particular, the indication of the relative phase of the RF waves is determined by the spatial deflection of an optical beam, instead of the amplitude of an electronic phase detector output.

Time difference of arrival is a well-documented and studied method of locating cellular telephone handsets. TDOA is one of several techniques that may be selected by wireless carriers for cellular telephone handset emergency caller, i.e., 911, locating requirements. Additional methods include, individually and collectively: angle of arrival, pattern matching, and global positioning satellite (GPS). In these systems the cellular telephone handset emits an RF signal that is received at various receiver sites. Because each receiver has a known location and is some distance from the cellular telephone handset, the RF signal the cellular telephone handset emits arrives at a given time at each receiver. The coordinates, i.e., longitude and latitude, of each receiver are maintained in a common database and used with the associated timing information to determine a trilateral position of the cellular telephone handset relative to each receiver site. In this situation, the receivers, synchronized by an atomic clock, send to a central site timing data concerning the occurrence time of a call from the cellular telephone handset to the cellular receivers. The central site includes a processor for comparing the times and computing the coordinates, i.e., location, of the cellular telephone handset.

U.S. Pat. Nos. 5,327,144 and 5,512,908 both describe a cellular telephone handset locating system of these general types. The systems disclosed in these patents utilize the three major components of a typical prior art locator system, i.e., at least three receivers at known sites, a central processing site, and an RF source in the form of a cellular telephone handset. The systems are obviously complex and have the problem previously mentioned with regard to electronic phase detectors.

It is, accordingly, an object of the present invention to provide a new and improved method of and apparatus for determining the position of a radio frequency source, particularly a cellular telephone handset.

Another object of the invention is to provide a new and improved method of and apparatus for determining the position of a radio frequency source using time difference of arrival techniques, wherein the relative phases of a radio frequency wave at a pair of spaced receivers is detected without employing an electronic phase detector which derives a null output when the source is approximately equi-distant from the spaced receivers.

An additional object of the invention is to provide a new and improved method of and apparatus for unambiguously determining the position of a cellular telephone handset, particularly for emergency locating purposes, in a relatively simple and inexpensive manner which minimizes possible processing errors.

SUMMARY OF THE INVENTION

According to one aspect of the invention, an apparatus derives a signal indicative of a possible position of a radio wave source relative to a pair of receiver sites having known positions, wherein the radio wave source emits a radio wave to which receivers at the sites are responsive. The apparatus comprises an optically diffractive medium capable of having a moving optical grating induced therein in response to acoustic waves propagating therein. First and second electro-acoustic transducers coupled to the optically diffractive medium launch first and second acoustic waves toward each other in the optically diffractive medium in response to electric excitation of the first and second transducers by replicas of the radio waves to which the pair of receivers are responsive. The transducers are positioned and arranged so that the first and second acoustic waves meet and interact with each other in the medium. An optical source illuminates the medium. An optical detector responsive to optical energy from the optical source and modulated by the moving grating derives a signal indicative of the relative phase angle of the radio wave replicas exciting the first and second transducers.

The acoustic waves typically propagate in a direction between the transducers. The detector arrangement preferably includes plural individual detector elements positioned in an array that extends in the same direction as the direction the acoustic waves propagate. The signal indicative of the relative phase angle is derived in response to an indication of the location of the detector element which has the greatest intensity of optical energy incident on it.

The apparatus is also arranged for determining the location of the radio wave source relative to at least three receiver sites having known positions. The apparatus further comprises a second optically diffractive medium capable of having a moving optical grating induced therein in response to acoustic waves propagating therein. Third and fourth electro-acoustic transducers coupled to the second optically diffractive medium launch third and fourth acoustic waves toward each other in the second optically diffractive medium in response to electric excitation of the third and fourth transducers by replicas of the radio waves to which the receivers at another pair of the sites are responsive. The third and fourth transducers are positioned and arranged so that the third and fourth acoustic waves interact with and meet each other in the second medium. A second optical source illuminates the second medium. A second optical detector arrangement responsive to optical energy from the second optical source and modulated by the second moving grating derives a second signal indicative of the relative phase angle of the radio wave replicas exciting the third and fourth transducers. A processor responsive to both of the signals indicative of relative phase angles and indications of the known positions of the receiver sites derives an indication of the location of the radio wave source relative to the known positions.

The apparatus can be used in a system having a receiver at each of the sites for receiving the radio wave. The radio wave source can be a cellular telephone handset in which case each of the receivers is included in a fixed cellular telephone transceiver. Preferably, each of the sites can determine the position of the cellular telephone handsets and existing cellular telephone hand-off processing detects the site receiving the strongest cellular telephone signal strength. The site detected as receiving the strongest cellular telephone signal strength derives the indication of the cellular telephone handset location.

Another aspect of the invention relates to a method of deriving a signal indicative of a possible position of a radio wave source relative to a pair of receiver sites having known positions. The method comprises causing the radio wave source to emit a radio wave and receiving the emitted radio wave at the pair of sites. Replicas of the radio waves received at the pair of sites are processed by causing acoustic replicas to propagate toward each other and meet in the optically diffractive medium while the medium is being illuminated by an optical beam. The acoustic replicas meeting in the medium cause modulation and deflection of the optical beam. In response to an indication of the deflection angle of the optical beam, a response determined by the relative phase of the replicas of the radio waves received at the pair of sites is derived.

Another aspect of the invention relates to an apparatus for determining the location of the radio wave source relative to at least three receiver sites having known positions. Each site is arranged to be responsive to the radio wave. The apparatus comprises an optically diffractive medium arrangement capable of having several optical gratings induced therein in response to acoustic waves propagating therein. Electro-acoustic transducers coupled to the optically diffractive medium arrangement launch several acoustic waves in the optically diffractive medium arrangement, a pair of the electro-acoustic transducers coupled with the optically diffractive medium arrangement cause a pair of acoustic waves to be launched toward each other so the pair of acoustic waves interact with each other in the optically diffractive medium arrangement. An optical source arrangement illuminates the optically diffractive medium arrangement. The several acoustic waves in the optically diffractive medium arrangement cause deflection of optical energy from the optical source arrangement. An optical-electric detector arrangement responds to optical energy from the source arrangement. A processor arrangement responsive to the optical-electric detector arrangement and indications of the known positions of the sites derives a signal indicative of the location of the radio wave source.

The above and still further objects, features and advantages of the present invention will become apparent upon consideration of the following detailed descriptions of several specific embodiments thereof, especially when taken in conjunction with the accompanying drawings.

DETAILED DESCRIPTION OF THE DRAWING

Figure 1:
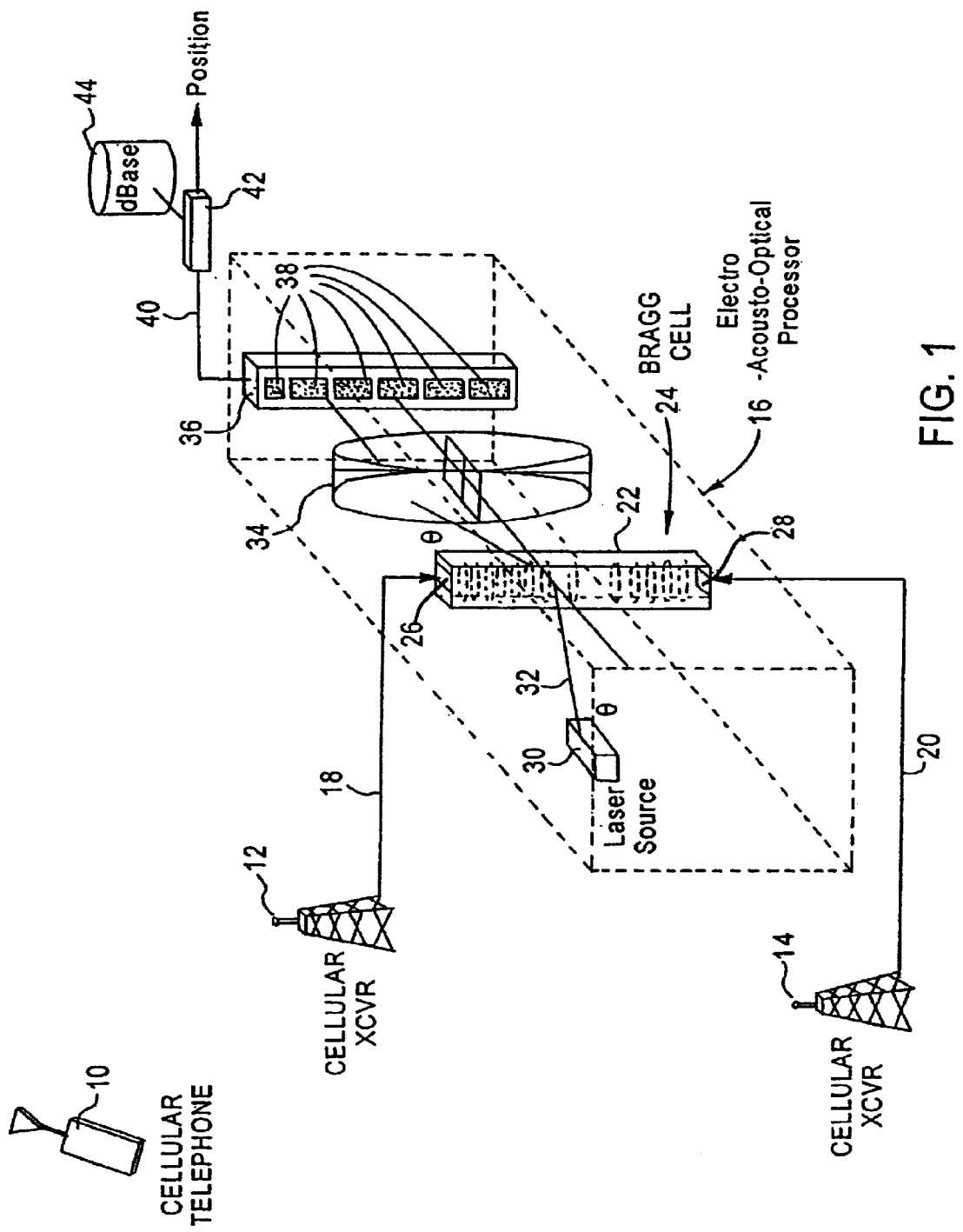
FIG. 1 is a schematic diagram of a preferred embodiment of a system in accordance with the invention for detecting possible locations of a cellular telephone handset.

Reference is now made to FIG. 1 of the drawing, an illustration of a system for determining possible positions of cellular telephone handset 10 relative to the sites of cellular transceivers 12 and 14, having known fixed positions. Cellular telephone handset 10, when in use, periodically emits a radio wave having known frequency and initial phase characteristics, such as a constant frequency having an initial phase of zero degrees modulating a carrier. Handset 10 transmits the radio wave having known frequency and initial phase characteristics to the sites of cellular transceivers 12 and 14.

Each of cellular transceivers 12 and 14 includes a receiver segment responsive to the radio wave cellular telephone handset 10 emits. The receiver segment of each of cellular transceivers 12 and 14 responds to the radio wave it receives from cellular telephone 10 to derive a replica of that portion of the wave having the known frequency and initial phase characteristics; for example, the constant frequency modulating the carrier. Each of transceivers 12 and 14 couples the replica it derives to electro-acousto-optical processor 16 which derives an output signal indicative of the time difference of arrival (TDOA) at the sites of cellular transceivers 12 and 14 of the radio wave that cellular telephone 10 emits. To this end, transceivers 12 and 14 are connected to processor 16 by communication links 18 and 20 having known characteristics, particularly signal propagation time between the sites of transceivers 12 and 14. Communication links 18 and 20 can be of any known type, such as land-based wire or fiber optic lines, or wireless paths.

Processor 16 can be located at a central station, but is preferably located at the site of one of cellular transceivers 12 and 14. If processor 16 is located at the site of one of cellular transceivers 12 or 14, the processing is performed at the site receiving the greatest signal strength of the radio wave that cellular telephone 10 emits. In such an event, the site of each of cellular transceivers 12 and 14 includes identical processors of the type illustrated by processor 16. In a typical cellular system, each cellular transceiver includes a detector arrangement for the strength of the signal received at the site of the transceiver. These detectors are coupled to each other to determine the site receiving the greatest signal strength from the radio wave a cellular telephone handset emits, to assure transmission of telephone signals between the cellular telephone handset and only one transceiver in the vicinity of the handset. Consequently, virtually no additional equipment is required at the sites of the cellular transceivers 12 and 14 to determine the site which is to perform the processing.

In one preferred embodiment, processor 16 is of a type disclosed in the co-pending, previously mentioned application, which is incorporated herein by reference. In particular, processor 16 includes optically diffractive medium 22 that forms Bragg cell 24. Piezo electric crystals, i.e., electro-acoustic transducers or cells, 26 and 28, bonded to opposite ends of diffractive medium 22, are connected to be responsive to the ends of links 18 and 20 connected to processor 16. Crystals 26 and 28 respond to the signal that links 18 and 20 supply to processor 16 to launch acoustic waves in medium 22. The acoustic waves travel toward each other, i.e., in opposite directions, in medium 22. The acoustic waves that crystals 26 and 28 launch in medium 22 are replicas of the signals links 18 and 20 supply to processor 16. The acoustic waves that crystals 26 and 28 launch are moving optical gratings that meet and combine in a linear manner in medium 22 so that, at points along the medium between the crystals, the amplitude of the acoustic wave is equal to the difference between the instantaneous amplitudes of the waves that the crystals launch, as coupled to those points. The length of medium 22 between crystals 26 and 28 is such that the acoustic waves from the crystals interact with each other in the medium and undergo insubstantial attenuation while propagating in the medium.

Laser source 30 derives an unmodulated monochromatic coherent optical beam 32 that illuminates a center portion of medium 22 where the acoustic waves interact. Beam 32 is incident on a first front face of medium 22 and is displaced from a line perpendicular to the propagation direction of the acoustic waves in medium 22 by the Bragg angle of the refractive material in medium 22.

Medium 22 responds to the moving optical grating that crystals 26 and 28 induce in the medium to diffract and amplitude modulate the coherent energy in beam 32. The modulated coherent energy in beam 32 emerges from medium 22 as a series of beamlets propagating from the second, back face of the medium. The deflection angles of the beamlets are determined by the diffractive index of the portion of medium 22 where beam 32 is incident on the medium; the diffractive index is determined by the amplitude of the acoustic waves propagating in the medium.

The beamlets propagating from the back face of medium 22 are incident on collimating lens 34 which converts these beamlets into parallel beamlets which are incident on linear photo electric detector array 36. Array 36 includes many optical-electric detector elements 38 which extend in the same direction as the direction of propagation of the acoustic waves in medium 22, i.e., elements 38 extend in the same direction as the direction of extent between crystals 26 and 28. Each of detector elements 38 derives a separate variable amplitude electric output signal commensurate with the amplitude of the optical energy in the beamlet incident on it. Each of detector elements 38 is connected by a separate lead in bus 40 to signal processor 42, also responsive to database 44 that stores signals indicative of the known positions of the sites where transceivers 12 and 14 are located, as well as the propagation speed and propagation time for the signals from the sites to travel to crystals 26 and 28. The positions of the sites where transceivers 12 and 14 are located can be determined from the known coordinates of the sites, in which case the coordinates are stored in the database. Alternatively, the positions of the sites where transceivers 12 and 14 are located can be determined instantaneously at each site from the global positioning system (GPS), in which case indications of the site positions are transferred by a communication link between the transceivers.

Processor 42 compares the amplitudes of the outputs of detector elements 38 to derive signals indicative of the amplitudes of the optical energy incident on each of the detector elements and an indication of which detector element has the highest amplitude optical energy incident thereon. The indication of which detector element has the highest amplitude optical energy incident on it enables processor 42 to derive a signal indicative of the difference in time of arrival (i.e., the phase difference) of the signals that links 18 and 20 respectively supply to crystals 26 and 28. Processor 42 combines the signal it derives indicative of the difference in time of arrival with the signals database 44 stores indicative of the positions of the sites of transceivers 12 and 14 and the signal propagation time of links 18 and 20 to derive an indication of possible locations of cellular telephone handset 10.

Figure 2:
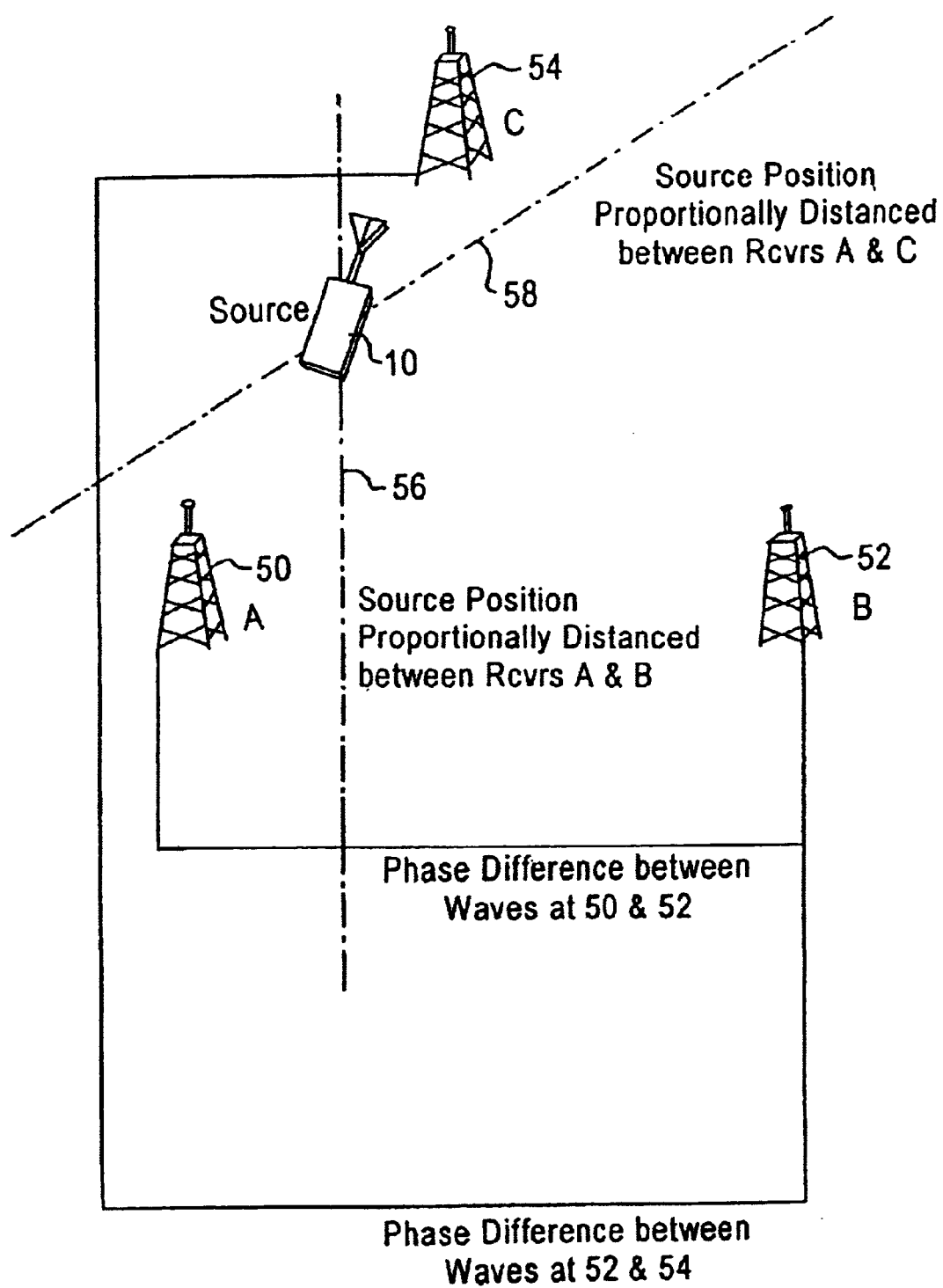
FIG. 2 is a schematic diagram of a preferred embodiment of a system in accordance with the invention for unambiguously detecting the location of a cellular telephone handset.

In the system of FIG. 1, processor 42 can only derive an indication of possible locations of cellular telephone handset 10, but cannot provide an absolute indication of the cellular telephone location. This is because the time difference of arrival times at the sites of transceivers 12 and 14 of the electric wave that cellular telephone handset 10 emits is the same if the cellular telephone has a mirror image position relative to the sites and for the line extending through the mirror images. Consequently, processor 42 must rely upon some additional information to completely determine the position of cellular telephone handset 10. This additional information can be from another signal source, for example, based on the history of movement of the cellular telephone handset. In a preferred embodiment, the additional information is obtained by a system having two pairs of cellular telephone transceivers, as illustrated in FIG. 2.

The system of FIG. 9 determines the position of cellular telephone handset 10 unambiguously with first, second and third sites respectively including cellular transceivers 50, 52 and 54. A first pair of receivers responsive to the radio wave that cellular telephone handset 10 emits is considered to include transceivers 50 and 52, while a second pair of receivers responsive to the radio wave that cellular telephone handset 10 emits is considered to include transceivers 50 and 54. Transceivers 50 and 52 are connected to each other and a processor, constructed the same as processor 16, FIG. 1, for determining the locus of points, which is straight line 56, between the transceivers 50 and 52 where cellular telephone handset 10 is located. Transceivers 50 and 54 are connected to each other and a processor, constructed the same as processor 16, for determining the locus of points, defined by straight line 58, between transceivers 50 and 54 where cellular telephone handset 10 is located. Output signals of the two processors are combined to determine the intersection of lines 56 and 58 which is the location of cellular telephone handset 10. Preferably, the processing is performed at the site of the transceiver receiving the strongest signal strength from cellular telephone handset 10. By processing the signals at the site of the transceiver receiving the strongest signal strength there is a minimalization of errors due to transferring signals and data to a central or common site for all the transceivers of a complete cellular system. There is a high likelihood of errors occurring in the transfer of signals and data to a central site of a complete cellular system because of the large number of cellular transceiver sites in a typical complete system and because each cellular transceiver site is usually shared by two or more cellular carriers.

Figure 3:
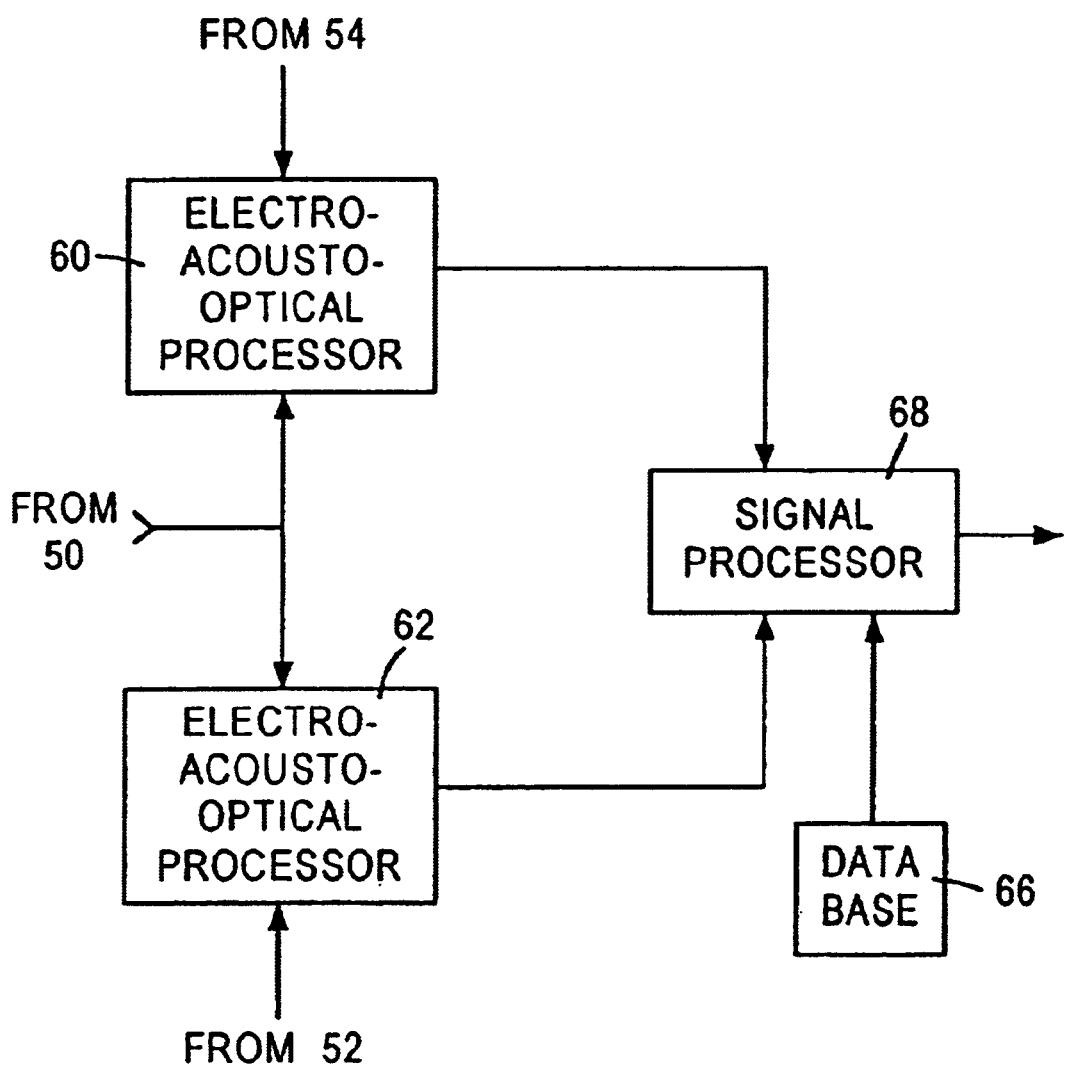
FIG. 3 is a block diagram of a preferred embodiment of equipment included at each of the cellular transceiver sites in the system of FIG. 2.

To these ends, each of the sites where transceivers 50, 52 and 54 are positioned includes, as illustrated in FIG. 3, first and second electro-acousto-optical processors 60 and 62 identical to processor 16, FIG. 1, a signal processor 64 similar to signal processor 42, and a database 66 similar to database 44. For example, the first electro-acousto-optical processor 60 at the site of transceiver 50 responds to the radio wave from cellular telephone handset 10 as received by the receivers at the sites of transceivers 50 and 52, while the second electro-acousto-optical processor 62 at the site of transceiver 50 responds to the radio wave from cellular telephone handset 10 as received by the receivers at the sites of transceivers 50 and 54. The database 66 at each of the sites of transceivers 50, 52 and 54 includes information with regard to the signal propagation times between each of the three sites, as well as the locations of the three sites. The signal processor 68, similar to signal processor 42, at each of the sites includes two or more comparators for detecting the relative signal strengths of the signals received by transceivers 50, 52 and 54, as well as processing circuitry for combining the output signals of the first and second electro-acousto-optical processors 60 and 62 at that site. In response to processor 68 at the site of transceiver 50 signaling that the receiver of transceiver 50 is responsive to a radio wave from cellular telephone handset 10 having a greater signal strength than the signals received at the sites of transceivers 52 and 54, the processor 68 at the site of transceiver 50 responds to the output signals of processors 60 and 62 and database 66 at that site to determine the location of cellular telephone handset 10. The transmitter portion of transceiver 50 responds to the signal that processor 68 derives indicative of the location of cellular telephone handset 10 and transmits that indication to other cellular telephone transceivers in the vicinity, for rebroadcast, for example, to emergency vehicles.

While there have been described and illustrated specific embodiments of the invention, it will be clear that variations in the details of the embodiments specifically illustrated and described may be made without departing from the true spirit and scope of the invention as defined in the appended claims. For example, the system of FIG. 2 can be modified so the two pairs of sites including cellular transceivers are formed by four different sites.

I claim:

1. Apparatus for deriving a signal indicative of a possible position of a radio wave source relative to a pair of receiver sites having known positions, the radio wave source being arranged for emitting a radio wave to which receivers at the sites are arranged to be responsive, the apparatus comprising an optically diffractive medium capable of having a moving optical grating induced therein in response to acoustic waves propagating therein, first and second electro-acoustic transducers coupled to the optically diffractive medium for launching first and second acoustic waves toward each other in the optically diffractive medium in response to electric excitation of the first and second transducers by replicas of the radio waves to which the pair of receivers are responsive, the transducers being positioned and arranged so that the first and second acoustic waves interact with each other in the medium, an optical source for illuminating the medium, and a detector arrangement arranged to be responsive to optical energy from the source and modulated by the moving grating for deriving a signal indicative of the relative phase angle of the radio wave replicas exciting the first and second transducers, the transducers and medium being arranged so the acoustic waves propagate in a direction between the transducers, the detector arrangement including plural individual optical detector elements positioned in an array that extends in the same direction as the direction the acoustic waves propagate, the signal indicative of the relative chase angle being derived in response to an indication of the location of the detector element which has the greatest intensity of optical energy incident on it.

2. The apparatus of claim 1 wherein the optical source is coherent and is arranged for projecting a beam that is incident on the medium at an angle that differs from a line normal to the acoustic wave propagation direction by the Bragg angle of the diffractive medium.

3. Apparatus for deriving a signal indicative of a possible position of a radio wave source relative to a pair of receiver sites having known positions, the radio wave source being arranged for emitting a radio wave to which receivers at the sites are arranged to be responsive, the apparatus comprising an optically diffractive medium capable of having a moving optical grating induced therein in response to acoustic waves propagating therein, first and second electro-acoustic transducers coupled to the optically diffractive medium for launching first and second acoustic waves toward each other in the optically diffractive medium in response to electric excitation of the first and second transducers by replicas of the radio waves to which the pair of receivers are responsive, the transducers being positioned and arranged so that the first and second acoustic waves interact with each other in the medium, an optical source for illuminating the medium, and a detector arrangement arranged to be responsive to optical energy from the source and modulated by the moving grating for deriving a signal indicative of the relative phase angle of the radio wave replicas exciting the first and second transducers, the detector arrangement being arranged to derive a signal indicative of the angle of the maximum intensity of the modulated optical energy relative to the propagation direction of the acoustic waves in the medium, the signal indicative of the relative phase angle being derived in response to the signal indicative of the angle of the maximum intensity of the modulated optical energy relative to the propagation direction of the acoustic waves in the medium.

4. The apparatus of claim 3 wherein the optical source is coherent and is arranged for projecting a beam that is incident on the medium at an angle that differs from a line normal to the acoustic wave propagation direction by the Bragg angle of the diffractive medium.

5. The apparatus of claim 3 wherein the apparatus is also arranged for determining the location of the radio wave source relative to at least three receiver sites having known positions, each arranged to be responsive to the radio wave, the apparatus further comprising a second optically diffractive medium capable of having a second moving optical grating induced therein in response to acoustic waves propagating therein, third and fourth electro-acoustic transducers coupled to the second optically diffractive medium for launching third and fourth acoustic waves toward each other in the second optically diffractive medium in response to electric excitation of the third and fourth transducers by replicas of the radio waves to which the receivers at another pair of the sites are responsive, the third and fourth transducers being positioned and arranged so that the third and fourth acoustic waves interact with each other in the second medium, a second optical source for illuminating the second medium, the detector arrangement being arranged to be responsive to optical energy from the second optical source and modulated by the second moving grating for deriving a second signal indicative of the relative phase angle of the radio wave replicas exciting the third and fourth transducers, the detector arrangement being arranged to derive a third signal indicative of the angle of the maximum intensity of the modulated optical energy in the second medium relative to the propagation direction of the acoustic waves in the second medium, the second signal indicative of the relative phase angle being derived in response to the third signal indicative of the angle of the maximum intensity of the modulated optical energy in the second medium relative to the propagation direction of the acoustic waves in the second medium, the detector arrangement being arranged to be responsive to both of the signals indicative of relative phase angles and indications of the known positions of the receiver sites for deriving an indication of the location of the radio wave source relative to the known positions.

6. A system for deriving a signal indicative of a possible position of a radio wave source relative to a pair of sites having known positions, the system comprising a receiver at each of the sites for receiving the radio wave, an optically diffractive medium capable of having a moving optical grating induced therein in response to acoustic waves propagating therein, first and second electro-acoustic transducers coupled to the optically diffractive medium for launching first and second acoustic waves toward each other in the optically diffractive medium in response to electric excitation of the first and second transducers by replicas of the radio waves to which the pair of receivers are responsive, the transducers being positioned and arranged so that the first and second acoustic waves interact with each other in the medium, an optical source for illuminating the medium, and a detector arrangement arranged to be responsive to optical energy from the source and modulated by the moving grating for deriving a signal indicative of the relative phase angle of the radio wave replicas exciting the first and second transducers, the detector arrangement being arranged to derive a signal indicative of the angle of the maximum intensity of the modulated optical energy relative to the propagation direction of the acoustic waves in the medium, the signal indicative of the relative phase angle being derived in response to the signal indicative of the angle of the maximum intensity of the modulated optical energy relative to the propagation direction of the acoustic waves in the medium.

7. The system of claim 6 wherein the optical source is coherent and is arranged for projecting a beam that is incident on the medium at an angle that differs from a line normal to the acoustic wave propagation direction by the Bragg angle of the diffractive material.

8. The system of claim 6 wherein the system is also arranged for determining the location of the radio wave source relative to at least three receiver sites having known positions, each arranged to be responsive to the radio wave, the system further including a receiver for the radio wave at each of the sites, a second optically diffractive medium capable of having a second moving optical grating induced therein in response to acoustic waves propagating therein, third and fourth electro-acoustic transducers coupled to the second optically diffractive medium for launching third and fourth acoustic waves toward each other in the second optically diffractive medium in response to electric excitation of the third and fourth transducers by replicas of the radio waves to which the receivers at another pair of the sites are responsive, the third and fourth transducers being positioned and arranged so that the third and fourth acoustic waves interact with each other in the medium, a second optical source for illuminating the second medium, the detector arrangement being arranged to be responsive to optical energy from the second optical source and modulated by the second moving grating for deriving a second signal indicative of the relative phase angle of the radio wave replicas exciting the third and fourth transducers, the detector arrangement being arranged to derive a third signal indicative of the angle of the maximum intensity of the modulated optical energy in the second medium relative to the propagation direction of the acoustic waves in the second medium, the second signal indicative of the relative phase angle being derived in response to the third signal indicative of the angle of the maximum intensity of the modulated optical energy in the second medium relative to the propagation direction of the acoustic waves in the second medium, the detector arrangement being arranged to be responsive to both of the signals indicative of relative phase angles and indications of the known positions of the receiver sites for deriving an indication of the location of the radio wave source relative to the known positions.

9. The system of claim 8 wherein the radio wave source comprises a cellular telephone handset and each of the receivers is included in a fixed cellular telephone transceiver.

10. The system of claim 9 wherein a plurality of the sites include: said first and second optically diffractive media, said first, second, third, and fourth transducers, said first and second optical sources, said first and second optical detector arrangements, and said processor; the processors of the sites being coupled together to select the site receiving the greatest signal strength of the radio wave for deriving an indication of the cellular telephone handset positions.

11. A method of deriving a signal indicative of a possible position of an emitted radio wave source relative to a pair of receiver sites having known positions, the method comprising receiving the emitted radio wave at the pair of sites, processing replicas of the radio waves received at the pair of sites by supplying to an optically diffractive medium acoustic replicas of the received radio waves, the acoustic replicas propagating toward each other and meeting in the optically diffractive medium, causing an optical beam to be incident on the acoustic replicas propagating in the medium, the acoustic replicas meeting in the medium causing modulation and deflection of the optical beam, and responding to an indication of the deflection angle of the optical beam to derive a response determined by the relative phase of the replicas of the radio waves received at the pair of sites.

12. The method of claim 11 wherein the radio wave source comprises a cellular telephone handset and cellular network transceivers at the sites receive the emitted radio wave.

13. The method of claim further comprising determining the location of the radio wave source relative to at least three sites having known positions, each site including a receiver for the emitted radio wave, receiving the emitted radio wave at receivers at a second pair of the sites, processing replicas of the radio waves received at the second pair of sites by supplying to a second optically diffractive medium second acoustic replicas that propagate toward each other and meet in the second optically diffractive medium, the second acoustic replicas meeting in the second medium causing modulation and deflection of the second optical beam, responding to an indication of the deflection angle of the second optical beam to derive a second response determined by the relative phase of the replicas of the radio waves received at the second pair of sites, and combining both responses to derive an indication of the radio wave source location.

14. The method of claim 13 wherein the radio wave source comprises a cellular telephone handset and cellular network transceivers at the sites receive the emitted radio wave.

15. The method of claim 14 further including detecting which of the sites receives the strongest signal strength radio wave, and deriving the indication of the radio wave source location at the site detected as receiving the strongest signal strength radio wave.

16. Apparatus for determining the location of a radio wave source relative to at least three receiver sites having known positions, each of the sites being arranged to be responsive to the radio wave, the apparatus comprising an optically diffractive medium arrangement capable of having several optical gratings induced therein in response to acoustic waves propagating therein, electro-acoustic transducers connected to be responsive to replicas of the radio wave at the sites and coupled to the optically diffractive medium arrangement for launching several acoustic waves in the optically diffractive medium arrangement, the acoustic waves being replicas of the radio waves at the sites, a pair of said electro-acoustic transducers being coupled with the optically diffractive medium arrangement to cause a pair of acoustic waves to be launched toward each other so the pair of acoustic waves interact with each other in the optically diffractive medium arrangement, an optical source arrangement for illuminating the optically diffractive medium arrangement, the several acoustic waves in the optically diffractive medium arrangement causing deflections of optical energy from the optical source arrangement, the deflection angles of the optical energy being indications of the relative phases of the replicas of the radio waves at the at least three receiver sites, an optical-electric detector arrangement arranged to be responsive to optical energy from the optical source arrangement, and a processor arrangement connected to be responsive to the optical-electric detector arrangement and indications of the known positions and the deflection angles for deriving a signal indicative of the location of the radio wave source.

17. The apparatus of claim 16 wherein the apparatus is included in a system including the sites, the system including: at least one of the sites including the optically diffractive medium and the processor.

18. The apparatus of claim 16 wherein the apparatus is included in a system including the sites, the system including: a plurality of the sites including the optically diffractive medium and the processor arrangement, a communication link for coupling the plurality of sites to each other, the processor arrangements at the sites being connected to be responsive to the links for detecting the site receiving the radio wave having the greatest signal strength and for causing the processor arrangement at the site receiving the radio wave having the greatest signal strength to perform the processing for deriving the signal indicative of the location of the radio wave source.

19. A method of determining the location of a wave emitted by a wave source comprising the steps of receiving the wave at three or more sites having known positions, launching in an optical diffracting medium arrangement several acoustic waves that are replicas of the wave, as received at the sites, the acoustic waves being launched while the optical energy is incident on the diffracting medium, the waves being launched so that pairs of them propagate toward each other and meet in the medium arrangement to cause deflection of the optical energy incident on the medium arrangement, the deflection angles of the optical energy being indications of the relative phases of the replicas of the radio waves at the at least three receiver sites, and indicating the position of the wave source in response to the indication of the deflected angles.

20. Apparatus for deriving a signal indicative of a possible position of a radio wave source relative to a pair of receiver sites having known positions, the radio wave source being arranged for emitting a radio wave to which receivers at the sites are arranged to be responsive, the apparatus comprising an optically diffractive medium capable of having a moving optical grating induced therein in response to acoustic waves propagating therein, first and second electro-acoustic transducers coupled to the optically diffractive medium for launching first and second acoustic waves toward each other in the optically diffractive medium in response to electric excitation of the first and second transducers by replicas of the radio waves to which the pair of receivers are responsive, the transducers being positioned and arranged so that the first and second acoustic waves interact with each other in the medium, an optical source for illuminating the medium, the optical source and medium being arranged so that a beam from the source incident on the medium is deflected by the medium by an angle indicative of the phase difference of the first and second acoustic waves, and a detector arrangement arranged to be responsive to the deflected beam for deriving a signal indicative of the deflection angle of the deflected beam.

21. The apparatus of claim 20 wherein the acoustic waves propagate in a direction between the transducers, the detector arrangement including plural individual optical detector elements positioned in an array that extends in the same direction as the direction the acoustic waves propagate, the signal indicative of the deflection angle being derived in response to an indication of the location of the detector element which has the greatest intensity of optical energy incident on it.

22. The apparatus of claim 21 wherein the detector arrangement is arranged for deriving a further signal indicative of the relative phase angle of the radio wave replicas exciting the first and second transducers.

23. The apparatus of claim 21 wherein the optical source is coherent and is arranged for projecting a beam that is incident on the medium at an angle that differs from a line normal to the acoustic wave propagation direction by the Bragg angle of the diffractive medium.

24. The apparatus of claim 20 wherein the optical source is coherent and is arranged for projecting a beam that is incident on the medium at an angle that differs from a line normal the acoustic wave propagation direction by the Bragg angle of the diffractive medium.

25. The apparatus of claim 20 wherein the detector arrangement is arranged to derive a signal indicative of the angle of the maximum intensity of the modulated optical energy relative to the propagation direction of the acoustic waves in the medium, the signal indicative of the deflection angle being derived in response to the signal indicative of the angle of the maximum intensity of the modulated optical energy relative to the propagation direction of the acoustic waves in the medium.

26. The apparatus of claim 25 wherein the optical source is coherent and is arranged for projecting a beam that is incident on the medium at an angle that differs from a line normal to the acoustic wave propagation direction by the Bragg angle of the diffractive medium.

27. The apparatus of claim 20 wherein the apparatus is also arranged for determining the location of the radio wave source relative to at least three receiver sites having known positions, each arranged to be responsive to the radio wave, the apparatus further comprising a second optically diffractive medium capable of having a second moving optical grating induced therein in response to acoustic waves propagating therein, third and fourth electro-acoustic transducers coupled to the second optically diffractive medium for launching third and fourth acoustic waves toward each other in the second optically diffractive medium in response to electric excitation of the third and fourth transducers by replicas of the radio waves to which the receivers at another pair of the sites are responsive, the third and fourth transducers being positioned and arranged so that the third and fourth acoustic waves interact with each other in the second medium, a second optical source for illuminating the second medium, the optical source and second medium being arranged so that a second beam from the second source incident on the second medium is deflected by the second medium by an angle indicative of the phase difference of the third and fourth acoustic waves, and a detector arrangement arranged to be responsive to the second deflected beam for deriving a second signal indicative of the deflection angle of the second deflected beam, the detector arrangement being arranged to be responsive to both of the signals indicative of the deflection angles of both beams and indications of the known positions of the receiver sites for deriving an indication of the location of the radio wave source relative to the known positions.

28. The apparatus of claim 27 wherein the detector arrangement is arranged to derive the second signal by deriving an indication of the angle of the maximum intensity of the modulated optical energy relative to the propagation direction of the acoustic waves in the second medium.

* * * * *